US007171478B2

(12) United States Patent
Lueckhoff et al.

(10) Patent No.: US 7,171,478 B2
(45) Date of Patent: Jan. 30, 2007

(54) SESSION COUPLING

(75) Inventors: Hermann Lueckhoff, Sunnyvale, CA (US); Ramprasad Rai, Sunnyvale, CA (US)

(73) Assignee: Sap Aktiengesellschaft (DE)

( * ) Notice: Subject to any disclaimer, the term of this patent is extended or adjusted under 35 U.S.C. 154(b) by 913 days.

(21) Appl. No.: 10/365,673

(22) Filed: Feb. 12, 2003

(65) Prior Publication Data
US 2004/0083292 A1    Apr. 29, 2004

Related U.S. Application Data

(60) Provisional application No. 60/421,363, filed on Oct. 25, 2002.

(51) Int. Cl.
*G06F 15/16* (2006.01)
(52) U.S. Cl. .................. 709/227; 709/203; 709/228
(58) Field of Classification Search ........ 709/201–203, 709/227–228, 236–237
See application file for complete search history.

(56) References Cited

U.S. PATENT DOCUMENTS

| 5,771,353 | A | * | 6/1998 | Eggleston et al. | .......... 709/227 |
| 5,784,562 | A | * | 7/1998 | Diener | .................. 709/227 |
| 6,064,973 | A |   | 5/2000 | Smith et al. | |
| 6,101,527 | A |   | 8/2000 | Bouchy et al. | |
| 6,286,030 | B1 | * | 9/2001 | Wenig et al. | .............. 709/203 |
| 6,480,894 | B1 | * | 11/2002 | Courts et al. | .............. 709/227 |
| 7,065,568 | B2 | * | 6/2006 | Bracewell et al. | .......... 709/203 |
| 7,099,915 | B1 | * | 8/2006 | Tenereillo et al. | .......... 709/203 |

FOREIGN PATENT DOCUMENTS

EP        0961202        12/1999

OTHER PUBLICATIONS

DCOM Technical Overview, Microsoft Corporation, Nov. 1996, 27 pgs.
Sommers, "Distributing Java: Remote Objects for Java," Java World, Jun. 1996, 10 pgs.
White Paper—SIP and SOAP, Ubiquity Software Corporation, White Paper Release 1.0, May 2001, pp. 1-11.

* cited by examiner

*Primary Examiner*—Bharat Barot
(74) *Attorney, Agent, or Firm*—Fish & Richardson P.C.

(57) ABSTRACT

Various implementations for session coupling in a distributed computing system are provided. In one implementation, a first server entity receives a transmission having an identifiable user context from a client entity. In response, the first server entity creates a first session that is related to the identifiable user context. A second server entity receives a transmission related to the first session from the first server entity. In response, the second server entity creates a second session that relates to the identifiable user context. The first and second sessions are coupled to create a common virtual session. The common virtual session is then bound to the identifiable user context so that the first and second server entities recognize that subsequent transmissions from the client entity relate to the common virtual session.

25 Claims, 7 Drawing Sheets

SESSION COUPLING

RELATED APPLICATION

The present application claims the benefit of the filing date of U.S. Provisional Application No. 60/421,363, which was filed on Oct. 25, 2002. The contents of U.S. Provisional Application No. 60/421,363 are hereby incorporated by reference into the present application in their entirety.

TECHNICAL FIELD

This invention relates to computing systems, and more particularly to session management in such systems.

BACKGROUND

In networked computing environments, the client-server architecture is widely used. In such environments, a server is capable of providing certain functionality, and processing data that is related to its functionality. The server is also capable of processing requests from a client. The client may function within a particular context, and send requests to the server to provide a certain functionality within that context. The server then is able to provide responses to the client to complete the interchange.

Over time, clients and servers both have evolved. Clients using the Internet often implement web browsers to accept input from a user, and to display results to the user. Servers are also often connected to the Internet, and provide various types of interfaces to communicate with clients. In additions, servers may be part of larger server systems, wherein each server has a designated functionality within the distributed server environment.

The use of the Internet has rapidly increased, and so has e-commerce. More and more individuals are using the Internet to conduct business, and to participate in transactions in which a great deal of information is exchanged. Sales people are now able to communicate with potential clients using the Internet, and customer service agents are also able to assist customers online. As e-businesses on the Internet have evolved, the need for customer interaction using the web has increased dramatically. Often, customers may be located in various parts of the world, and companies continually find a need for better and more efficient means of interaction with their customers.

To implement e-business functionality over the web, certain systems have implemented a client-server architecture to process transactions. Clients using web browsers have interacted with web servers to obtain needed functionality. Users of the client devices may be, for example, customer care agents who wish to interact with customers online. For a given transaction or user context, the client requests information and/or functionality from the web server for the given user context. The web server may create and process session information specific for the user context, and send a response back to the client. The web server may also store state information relating to the session, so that it may quickly and accurately exchange information with the client for the given user context over time.

Many server architectures today, however, are distributed in nature. That is, a server system may include two or more independent servers each providing their own functionality within the system. The distributed server system is very powerful, because it can provide a wide assortment of functionalities to clients using the system, and can provide load balancing. The distributed system, however, also poses difficulties when used by clients during e-business transactions. For a given transaction, a client may send a request to a server system for processing. Such a request may need to be processed by two or more independent servers within the system. For example, a first server may need to store session (or state) information in its database relating to the transaction, and a second server may also need to store session information in its database relating to the transaction. In the past, such server systems have provided a distributed architecture in which independent servers are able to store independent session information relating to a particular transaction. This poses a problem for clients who need to interact with each of the servers in the server system for a given transaction. Because independent servers on the system maintain independent session information for a transaction on a given client, the client will often need to manage the interaction between itself and each of the independent servers. This creates a substantial amount of overhead for the client. In addition, the client may need to maintain a separate connection to each of the servers in the system.

SUMMARY

Various implementations for session coupling in a distributed computing system are provided. In one implementation, a first server entity receives a transmission having an identifiable user context from a client entity. In response, the first server entity creates a first session that is related to the identifiable user context. A second server entity receives a transmission related to the first session from the first server entity. In response, the second server entity creates a second session that relates to the identifiable user context. The first and second sessions are coupled to create a common virtual session. The common virtual session is then bound to the identifiable user context so that the first and second server entities recognize that subsequent transmissions from the client entity relate to the common virtual session.

Advantages of certain implementations of the invention may be one or more of the following. Session management may be achieved between applications executing on various servers. Independent sessions may be established on various servers and coupled through one virtual session, allowing the servers to share one user context for exchanging information. Each independent session is able to call methods or functions of the other side so that data synchronization can happen at any given time. This functionality may enhance the flow of transactional data used in an e-business context.

The details of one or more implementations of the invention are set forth in the accompanying drawings and the description below. Other features, objects, and advantages of the invention will be apparent from the description and drawings, and from the claims.

DETAILED DESCRIPTION

Figure 1:
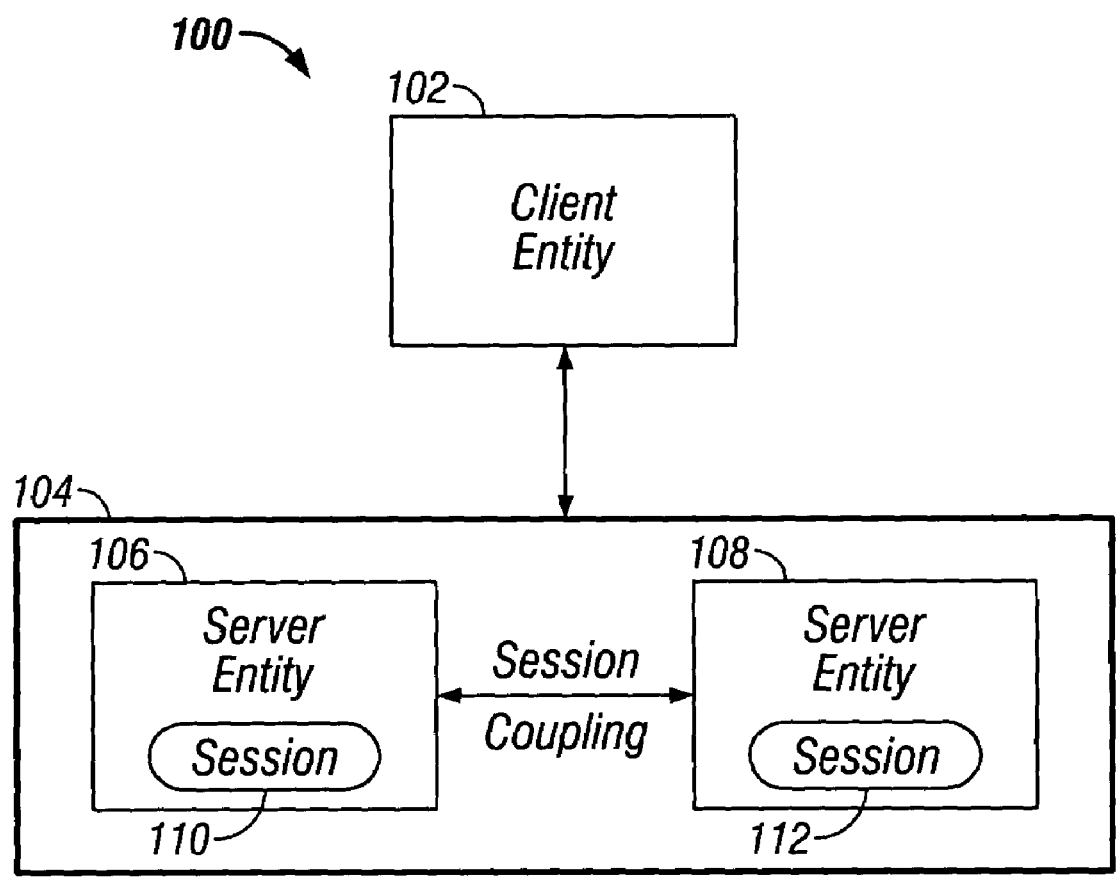
FIG. 1 illustrates a block diagram of a system incorporating one implementation of session coupling.

In system 100, shown in FIG. 1, client entity 102 is interconnected to communicate with server system 104. Server system 104 includes two different server entities 106 and 108, which perform different functions that combine to provide various integrated computing processes. Server entities 106 and 108 are also interconnected to communicate directly between one another. Session 110 created on server entity 106 is coupled with session 112 created on server entity 108 to create a common virtual session for a user of client entity 102.

In one implementation, client entity 102 includes a web browser that may be displayed to a user (such as a calling agent in an e-business setting), and has a web-based interface with server system 104. Server entity 106 includes session 110 operating on its run-time stack, and server entity 108 includes session 112 operating on its run-time stack. In one implementation, client entity 102 generates an event for a specific user context (e.g., an online chat communication with a particular user), and sends a message to server system 104. Server entity 108 creates session 112 for the user context, and server entity 106 creates session 110 for the user context. Server system 104 then couples session 110 and session 112 to create a common virtual session for the user context. In one implementation, a user context corresponds to an event or transaction with a particular user. The user may need to log into the system using a username and/or password, and in some implementations, the user is authenticated.

Sessions 110 and 112 contain state information for the user context, in one implementation. This information is particular to the user context, and may include transactional information, contextual information, interface information, and the like. Session 112 relates to the operational (and state) functionality of server entity 108, and session 110 relates to the operational functionality of server entity 106. In one implementation, server entity 108 provides a single-threaded execution environment. In one implementation, server entity 106 provides a multi-threaded execution environment.

During operation, client entity 102 provides a graphical user interface (GUI) to a user (in one implementation). The user interacts with the GUI. In one implementation, system 100 is an Interaction Center (IC), and the user is a call-center agent who is interacting with a customer. The user may be engaged in a phone conversation, chat session, email interchange, or the like. As a result of the user interaction, client entity 102 transmits requests to, and receives responses from, server system 104. These requests and responses include information that is specific to the user context (or interaction) on client entity 102. After receiving a request from client entity 102, server system 104 processes the request.

In one implementation, server entity 108 first processes the request, and creates session 112 that is particular to the user context from client entity 102. Session 112 includes state information for the user context. For example, session 112 may include chat or email state information. Server entity 108 provides a specific functionality within server system 104, and session 112 contains information associated with this functionality that is particular to the user context. Server entity 106 then creates session 110 particular to the user context. Server entity 106 provides another specific functionality within server system 104 (in other words, there is a distributed server architecture within server system 104). Session 110 contains information associated with the functionality of server entity 106 that is particular to the user context.

Session 110 and session 112 are then coupled in a bi-directional fashion. That is, the session information for session 110 is shared with server entity 108, and the session information for session 112 is shared with server entity 106. Server entity 106 is able to send the session information for session 110 to server entity 108, and server entity 108 is able to send the session information for session 112 to server entity 106. This achieves bi-directional session coupling, and provides data synchronization between servers in server system 104.

Figure 2:
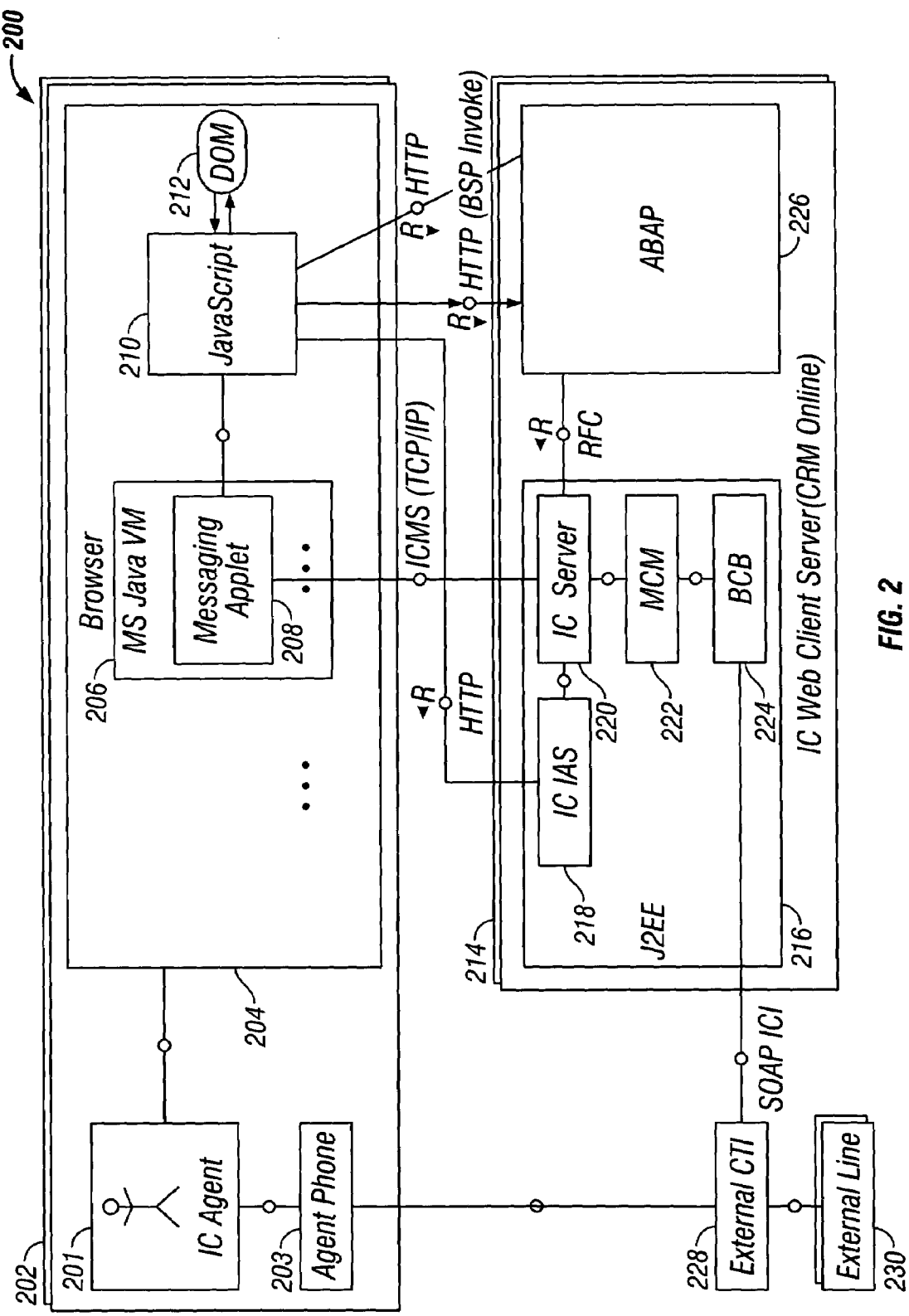
FIG. 2 illustrates a block diagram of a detailed implementation for a system of the type shown in FIG. 1.

FIG. 2 illustrates a block diagram of a more specific implementation of a system of the type shown in FIG. 1. In this implementation, system 200 is part of an Interaction Center (IC) in an e-business environment. FIG. 2 shows a block diagram containing various components. For example, there are actors, such as agent 201. There are certain components that serve as data stores, and there are various flows of data between the components, such as Hypertext Transfer Protocol (HTTP) requests and responses. System 200 includes client entity 202 and server system 214. Client entity 202 provides various client-side functionalities. In this implementation, in which system 200 functions as an Interaction Center (IC), a call-center agent may use client entity 202 while interacting with a customer (e.g., via phone, email, chat, etc.). Client entity 202 is operatively coupled to two different servers in server system 214: server entity 226 (ABAP), and server entity 216 (J2EE). Server entities 226 and 216 provide different server-side functionalities (in this implementation), and provide server system 214 with a distributed-functionality architecture. ABAP server 226 is coupled with J2EE server 216 via a remote function call (RFC) interface. Using RFC, these servers may share session data for a given user context on client entity 202. External computer telephony integration (CTI) 228 is coupled to agent phone 203 of client entity 202, and provides an external phone functional interface. External line 230 is coupled to external CTI 228. External CTI 228 also propagates event information via a Simple Object Access Protocol (SOAP) interface into server system 214 (and directly to business communication broker (BCB) 224). During operation, call-center agent 201 uses browser 204 on client entity 202 to interact with a customer. As a result of the interaction, client entity 202 propagates events particular to the transaction (or user context of agent 201) to server system 214. ABAP server 226 and J2EE server 216 create independent sessions (containing state information specific to the transaction initiated on client entity 202). These independent sessions are then coupled to form a common virtual session for the user context, and data synchronization is achieved in server system 214.

Client entity 202 includes browser 204. Browser 204 is utilized by a user, which is shown as IC call agent 201 in FIG. 2. In an e-business environment, a call agent may use browser 204 on client entity 202, as well as other tools (such as agent phone 203), when interacting with a customer. Such interactions are part of customer relationship management (CRM), in some implementations. CRM is an information industry term for the methodologies, software, and often Internet capabilities that help an enterprise manage customer relationships in an organized way. In FIG. 2, browser 204 includes Java virtual machine (VM) 206, which includes run-time messaging applet 208 for messaging operations. JavaScript module 210 is used to implement an external interface to server system 214, and the code interacts with document object model (DOM) 212, in one implementation. DOM 212 is a platform- and language-neutral interface that allows programs and scripts to dynamically access and update the content, structure, and style of documents.

Client entity 202 is coupled to server system 214 using two interfaces. The first interface is a web-enabled HTTP request/response interface. The second interface is a Transmission Control Protocol/Internet Protocol (TCP/IP) interface. In one implementation, the TCP/IP interface provides a dedicated, persistent, and bi-directional connection between client entity 202 and server system 214. JavaScript module 210 used by browser 204 manages HTTP requests that are sent to server system 214. HTTP requests are sent both to ABAP server 226 and to J2EE server 216 (specifically to IC interactive scripting (TAS) module 218, in one implementation). In one implementation, HTTP requests are sent only from client entity 202 to ABAP server 226. The TCP/IP interface couples client entity 202 directly to J2EE server 216. A messaging service (in IC Server 220) operates on J2EE server 216 to form the server side of the TCP/IP interface, and messaging applet 208 running on browser 204 forms the client side of the interface. Messaging applet 208 running on browser 204 exposes an interface to the client code (JavaScript 210) for subscription, notification of incoming messages, and sending of outgoing messages. The persistent TCP/IP connection (which uses the Interaction Center Messaging Service, or ICMS) allows client 202 and J2EE server 216 to communicate on an as-needed basis.

Server system 214 includes ABAP (enterprise) server 226, and Java 2 Platform, Enterprise Edition (J2EE) server 216. ABAP is a programming language for developing applications on an SAP system (which is a widely installed business application system). ABAP is an object-oriented programming language. J2EE is a Java platform designed for large enterprise systems. J2EE simplifies application development, and uses standardized, reusable modular components. In other implementations, other structured or object-oriented programming languages may be used on server 226. IC Server module 220 is the container for all Java components, and provides a basic session management. ABAP server 226 and J2EE server 216 illustrate the distributed server architecture of server system 214.

ABAP server 226 is able to communicate with J2EE server 216 using a remote function call (RFC) interface. In other implementations, different methods of communication between ABAP server 226 and J2EE server 216 are used. In one implementation, HTTP may be used.

J2EE server 216 includes BCB component 224 that is coupled with external CTI 228 using a SOAP interface. BCB 224 is coupled with multi-channel manager (MCM) 222 for handling events across the multi-channel interface. Various external conditions in system 200 may trigger events that need to be processed. For example, certain multi-channel events (e.g., phone, chat, etc.) may occur as a result of call agent interaction with a customer. These events can be propagated, in one implementation, to J2EE server 216 using a multi-channel connection. In one implementation, SOAP is used for the multi-channel interface into J2EE server 216. External CTI 228 generates multi-channel events that are propagated from BCB 224 to MCM 222, and then further processed by IC Server 220.

Figure 3:
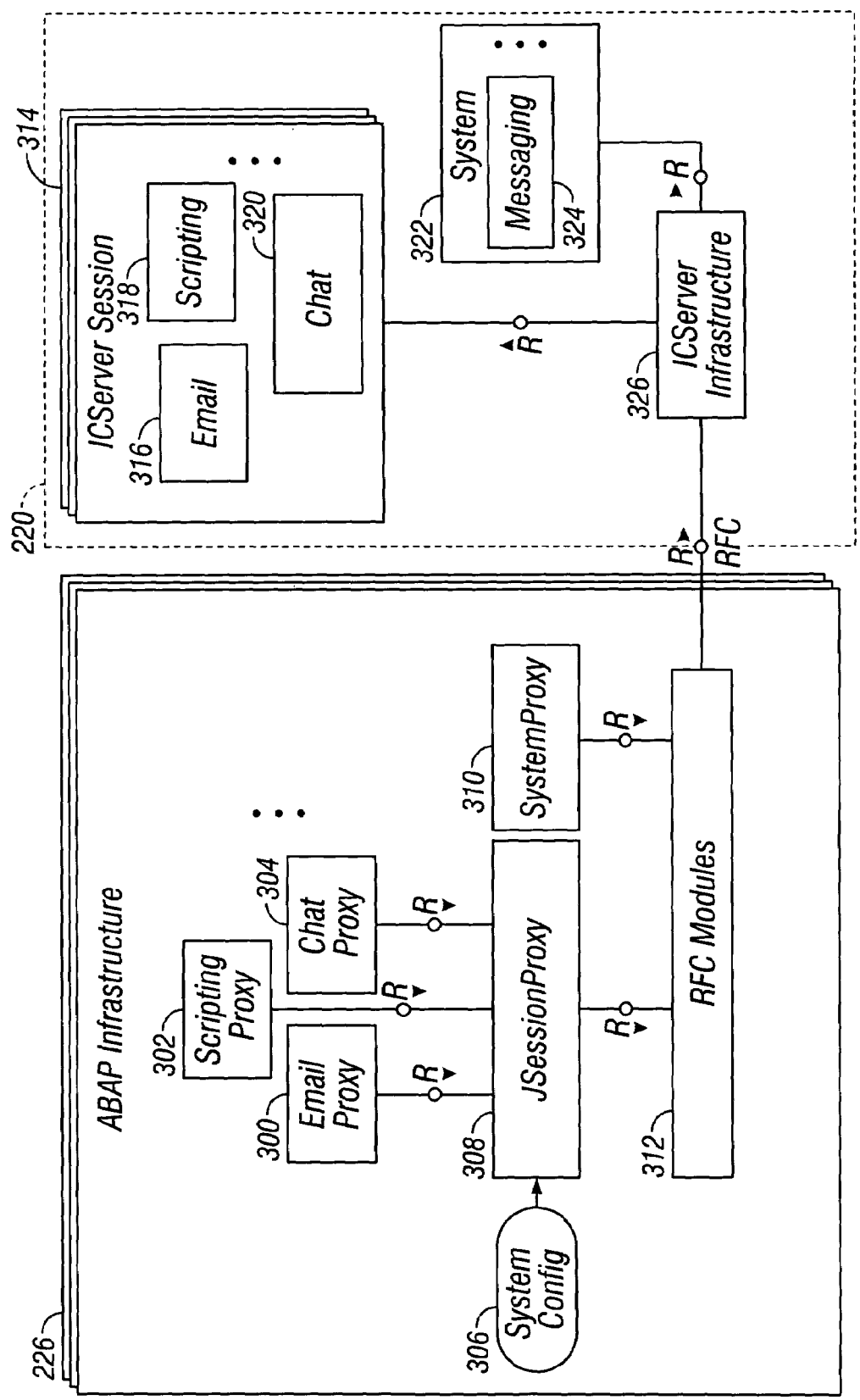
FIG. 3 illustrates a block diagram of a detailed implementation of session coupling for the system shown in FIG. 2.

FIG. 3 illustrates a block diagram of a detailed implementation of ABAP server 226 and IC Server 220 shown in FIG. 2. ABAP server 226 and IC Server 220 each support independent session management for a user context on client entity 202 (in one implementation), but are also capable of synchronizing their session information for the user context.

ABAP server 226 includes various proxies. These proxies serve as intermediaries between ABAP server 226 and external components, such as IC Server session 314 (which is part of IC Server 220). These proxies also provide hooks (or available interfaces) into the RFC modules, which invoke the needed functionalities using IC Server infrastructure 326. ABAP server 226 includes email proxy 300, scripting proxy 302, and chat proxy 304. These proxies provide the necessary intermediaries into email 316, scripting 318, and chat 320 components supported in IC Server session 314. When a user (such as a calling agent who uses a web-browser interface to communicate with a customer) selects an email, scripting, or chat operation (for example), ABAP server 226 will receive an HTTP request for the operation. The email proxy 300, scripting proxy 302, or chat proxy 304 on ABAP server 226 will respectively invoke the email component 316, scripting component 318, or chat component 320 of IC Server session 314 using RFC. ABAP server 226 is coupled to IC server infrastructure 326 using RFC calls. ABAP server 226 has system configuration 306, which is used by JsessionProxy 308. JsessionProxy 308 is another proxy serving as an intermediary between the various proxies 300, 302, and 304 and RFC modules 312. JSessionProxy 308 helps manage each of these session proxies. ABAP server 226 also includes SystemProxy 310, for session independent system-level communication using RFC.

IC Server infrastructure 326 is coupled to IC Server session 314 and IC System component 322. IC Server infrastructure 326 directs session-level requests (e.g., email, scripting, chat) to IC Server session 314, and directs system-level requests to IC System component 322. In one implementation, these entities are included in a J2EE server. IC System component 322 is capable of sending messages to other entities using messaging component 324.

Figure 4:
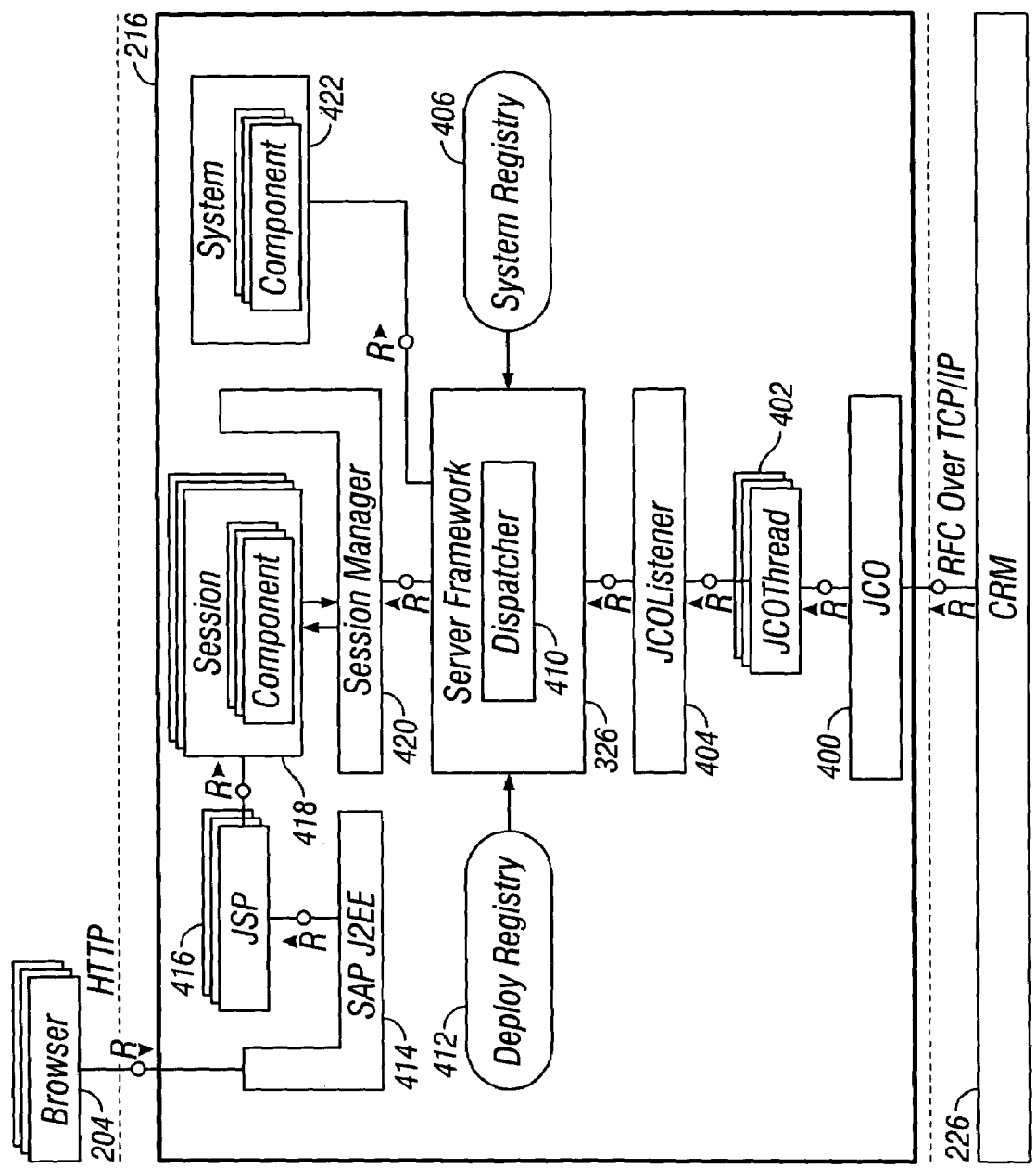
FIG. 4 illustrates a block diagram of a detailed implementation of a component for the system shown in FIG. 2.

FIG. 4 illustrates a block diagram of a detailed implementation of J2EE server 216 shown in FIG. 2. FIG. 4 shows browser 204, J2EE server 216, and customer relationship management (CRM) server 226 (which is an SAP enterprise server running ABAP, in one implementation). Browser 204 is instantiated on a client entity, and is able to send HTTP requests to J2EE server 216. CRM server 226 handles various e-business functionalities relating to CRM, and sends requests to J2EE server 216 via RFC calls. In one implementation, CRM server 226 utilizes business objects (as part of an object-oriented business model), in an ABAP programming environment.

J2EE server 216 includes deploy registry 412, system registry 406, and server framework 326. Deploy registry 412 and system registry 406 provide registry-level management, and serve as inputs into server framework 326. RFC calls arriving from CRM server 226 are processed by the Java connection (JCO) layer 400. JCO is a communication protocol that sits on top of TCP/IP in the Open System Interconnection (OSI) communication stack. JCO layer 400, JCO Thread 402, and JCO Listener 404 serve as middleware used in various SAP implementations (and for the implementations represented by FIG. 4) to process RFC calls from CRM server 226. JCO Thread 402 provides multi-threaded functionality within J2EE server 216. Dispatcher 410 (in server framework 326) then determines whether to process the request using a system-level component in 422 or a session-level component in 418. The session manager handles session-level component management in 418, so that sessions for a given user context may be coupled with CRM server 226.

HTTP requests arriving from browser 204 are processed by SAP J2EE engine 414. J2EE server 216 uses Java Server Page (JSP) component 416 for the interface with browser 204. JSP's help control the content or appearance of web pages shown on browser 204. JSP component 416 runs servlets (as a result of the HTTP requests sent by browser 204) on J2EE server 216 to modify the web pages before they are sent back (via HTTP responses) to browser 204.

Figure 5:
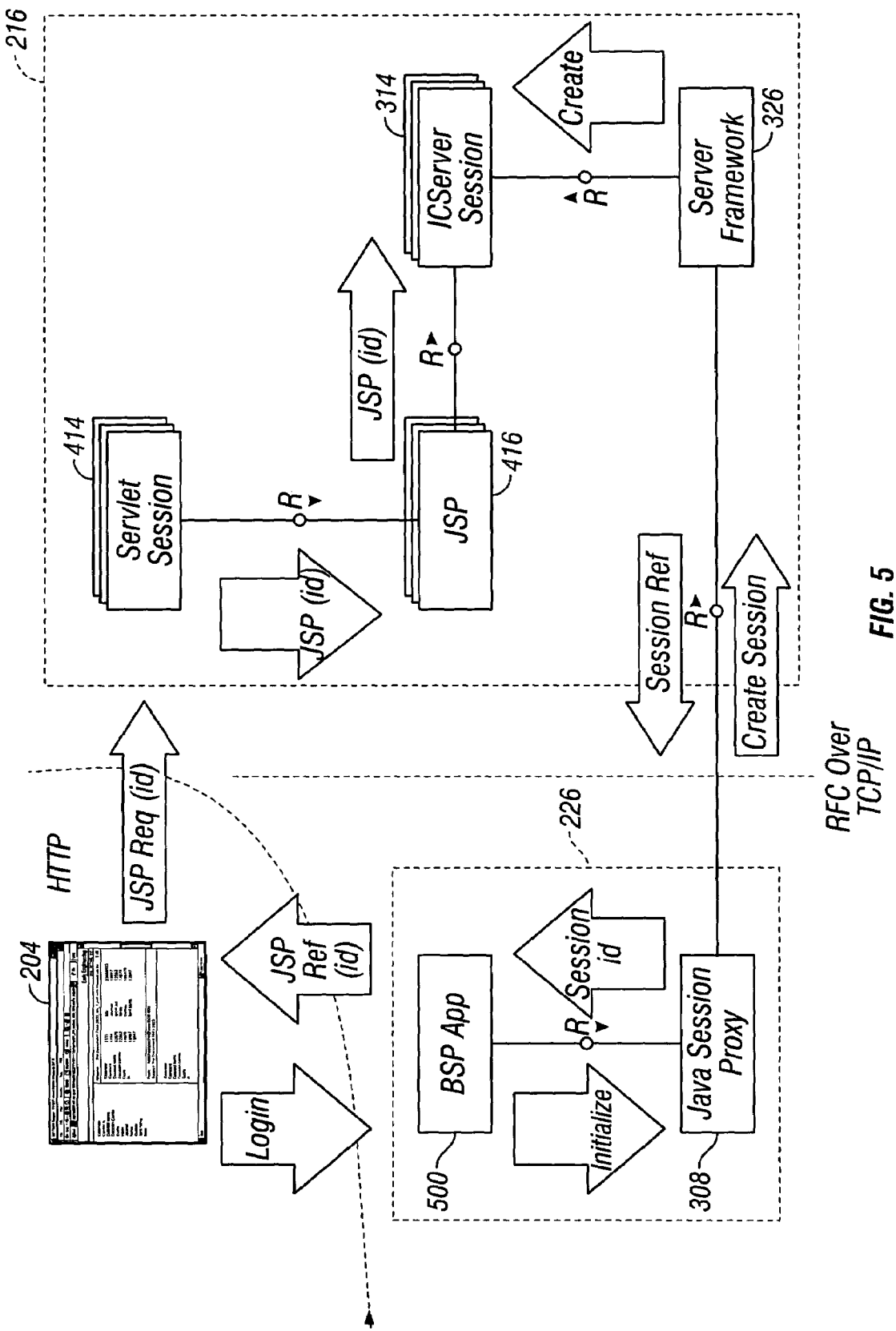
FIG. 5 illustrates a block diagram of a flow of session information, according to one implementation.

FIG. 5 illustrates a block diagram of a flow of session information from ABAP server 226 to J2EE server 216, according to one implementation. In this implementation, session coupling for a user context between a first server and a second server is achieved by initiating a client request from a client entity and propagating it through the first and second servers.

As shown in FIG. 5, browser 204 on client entity initiates session coupling by generating an HTTP request. Browser 204 is displayed to a user, and an event is generated to trigger the transmission of the HTTP request. In one implementation, a call-center agent (in an Interaction Center) uses browser 204 to interact with a customer, and creates an HTTP request as a result of a specific transaction with the user. Browser sends the HTTP request to ABAP server 226 (using a web login command, in one implementation). In one implementation, ABAP server 226 provides business server pages (BSP) application 500 functionality in e-business operations. BSP application 500 uses business objects (as part of a business model) to provide one or more business operations, and helps create the content of business web pages before they are sent back to browser 204. BSP application may determine (in one implementation) if an email, scripting, or chat business functionality is requested or required. BSP application 500 then sends a session initialization command (specific for the user context on browser 204) to Java session proxy 308. In this fashion, ABAP server 226 is able to create a session (specific to the user context) on its run-time stack, and store state information pertinent to the session.

Java session proxy 308 then sends a request to server framework 326 (on J2EE server 216) for creating a session using RFC. Server framework 326 creates an instance of IC server session 314, which may host chat, scripting, email, or other type of component (in one implementation). In various scenarios, the user of browser 204 may be engaged in a chat, scripting, email, or other type of transaction with a customer. A unique session identifier is associated with the IC server session 314 on J2EE server 216. Then, server framework 326 returns the unique session identifier back to Java session proxy 308. Java session proxy 308 forwards the session identifier to BSP application 500. ABAP server 226 now has reference to the session within J2EE server 216 that is bound to the same user context, and in this fashion is able to couple its own session management for the user context with that of J2EE server 216. In essence, ABAP server 226 and J2EE server 216 are able to share state information in a common virtual session shared between their run-time stacks. In one implementation, ABAP server 226 is capable of invoking subsequent RFC calls to the appropriate Java session on the J2EE server 216 using the unique session identifier. In one implementation, ABAP server 226 stores the unique session identifier in a volatile or non-volatile storage area. BSP application 500 returns the unique session identifier to browser 204 in client entity 202. In one implementation, BSP application 500 sends web-enabled cookie information to browser 204, which contains the unique session identifier. In this implementation, browser 204 is able to store the cookie information on client entity 202 for future reference. In this fashion, subsequent HTTP requests from browser 204 will be directed to the correct user session on ABAP server 226 by using the cookie information.

In one implementation, browser 204 sends a request to servlet session 414 on J2EE server 216 via a JSP call. This request includes the unique session identifier corresponding to a given user context (or transaction) on browser 204. Servlet session 414 is able to forward the JSP request to JSP component 416. The request is then sent to an appropriate instance of the IC server session 314 that is bound to the unique session identifier, where it can be processed as needed for the given transaction.

In one implementation, session destruction occurs in a substantially synchronous fashion. When a user ends a transaction on browser 204, the corresponding session information on ABAP server 226 and J2EE server 216 is deleted. In one implementation, browser 204 sends a request for session deletion for a user context to ABAP server 226. ABAP server 226 deletes the session information for the user context, and then sends a deletion request for the user context to J2EE server 216. J2EE server 216 then deletes its session information.

Figure 6:
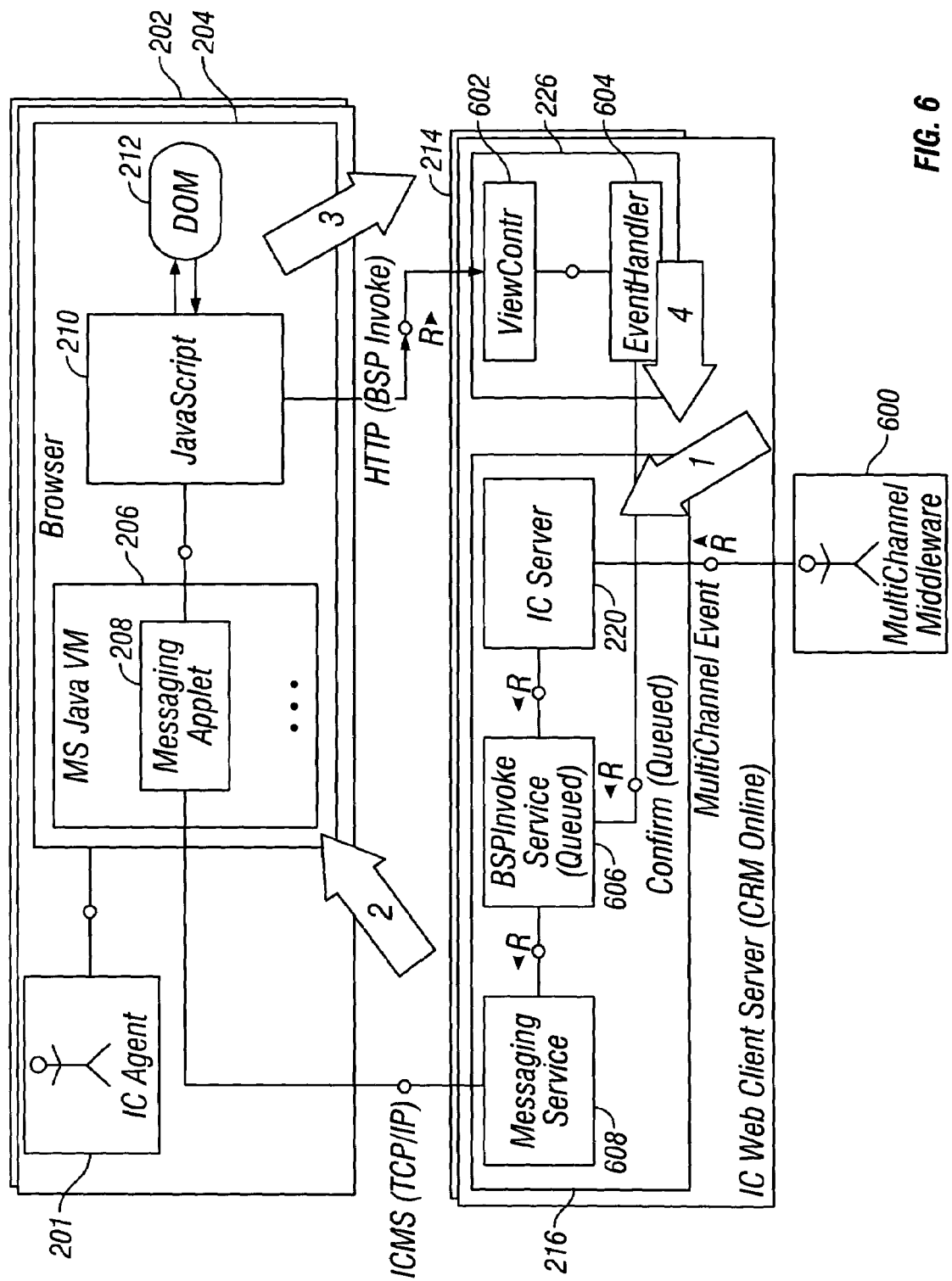
FIG. 6 illustrates a block diagram of a flow of session information, according to one implementation.

FIG. 6 illustrates a block diagram of a flow of session information from J2EE server 216 to ABAP server 226 (via client entity 202), according to one implementation. In this implementation, session coupling for a user context between a first server and a second server is achieved by initiating a request from one server to the other server (in server system 214) using client entity 202 as an intermediary. In one implementation, the methods shown in FIG. 5 and FIG. 6 provide bi-directional session coupling.

As shown in FIG. 6, event processing begins when multi-channel middleware 600 transmits a multi-channel event to IC server 220 in J2EE server 216. There are a number of multi-channel events that can be propagated to J2EE server 216. For example, a call agent may interact with a customer in various modes of communication across multiple channels, such as email, chat, phone, etc. Various activities associated with the email, chat, or phone communication will cause multi-channel events that will be generated (such as dialogue initiation, carrier termination, etc.). Once IC server 220 receives notification of the multi-channel event, it forwards the notification to the BSPInvoke service 606, which then forwards the notification the messaging service 608.

In one implementation, messaging service 608 runs a messaging service having a persistent ICMS TCP/IP interface to messaging applet 208 on Java VM 206. Because the TCP/IP connection is persistent, messaging service 608 has a dedicated connection for sending messages to browser 204. Thus, J2EE server 216 is able to send a message to inform client entity 202 of the multi-channel event.

In one implementation, the multi-channel event is associated with the interaction with IC agent 201 and a customer. IC agent 201 is a user of browser 204. When messaging applet 208 receives the notification message from messaging service 608, the message is processed by Java VM 206. During processing, browser 204 must retrieve the appropriate session information corresponding to the given event. In one implementation, browser 204 retrieves the unique session identifier corresponding to the transaction, or user context, for the multi-channel event. In one implementation, browser 204 retrieves stored cookie information that contains the unique session identifier. In this fashion, browser 204 associates the session identifier with the multi-channel event (and corresponding event information). Java VM 206 uses JavaScript component 210 (containing JavaScript code) and DOM 212 for preparing a request to be sent to ABAP server 226. In other implementations, other script languages (such as Virtual Basic Script) can be used in place of JavaScript. Browser 204 sends an HTTP command to ABAP server 226. This command includes the session identifier for the user context. In one implementation, the request includes retrieved cookie information containing the session identifier.

ABAP server 226 includes view controller 602 and event handler 604. The HTTP request is processed by view controller 602 and event handler 604, and use the unique session identifier to update the session information on ABAP server 226 bound to the user context. In this fashion, session coupling is achieved. J2EE server 216 is able to couple its session (and state information) with the session on ABAP server 226 for the given user context, using client entity 202 as an intermediary, in response to a multi-channel event propagated by multi-channel middleware 600.

In one implementation, the method shown in FIG. 6 further includes sending parameter information from event handler 604 in ABAP server 226 to J2EE server 216 (in one implementation). In this implementation, ABAP server 226 uses an RFC interface to send parameter information to J2EE server 216 as a result of the original message sent by J2EE server 216 to browser 206, requesting parameter information. J2EE server 216 will wait until it receives the parameter information from ABAP server 226 (relating to the multi-channel event), thereby completing the session coupling loop. In one implementation, the original message sent by J2EE server 216 to browser 206 requires the return of parameters by ABAP server 226. In this implementation, a Java thread on J2EE server 216 is set into a wait state until it receives notification that ABAP server 226 has sent the return parameters using the RFC connection. This notification mechanism is managed by a separate thread on J2EE server 216, which associates a call identification with the waiting thread. This call identification is passed along with the return parameters from ABAP server 226, and thus enables the notification thread to notify the appropriate waiting thread on J2EE server 216. The multi-threaded execution environment on J2EE server 216 allows such functionality, in this implementation.

Figure 7:
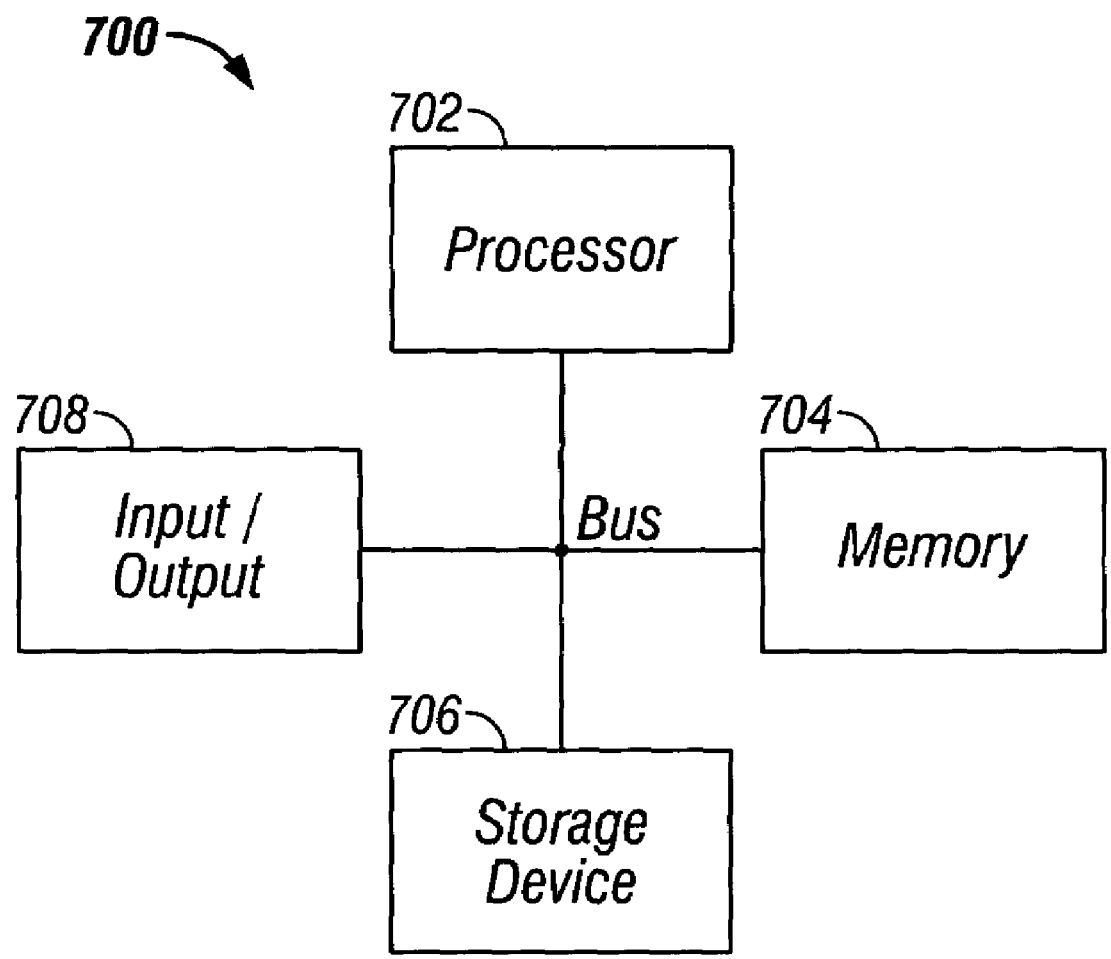
FIG. 7 illustrates a block diagram of a computing system having various computer-readable media.

FIG. 7 illustrates a block diagram of a computing system having various computer-readable media. Various implementations of the invention may be embodied in hardware, software, or a combination of hardware and software. For example, client entity 102, server entity 106, and/or server entity 108 (each shown in FIG. 1) may be implemented by a system similar to the one shown in FIG. 7. System 700 includes processor 702, memory 704, storage device 706, and input/output device 708. Each of components 702, 704, 706, and 708 are interconnected using a system bus. Processor 702 is capable of processing instructions for execution within system 700. In one implementation, processor 702 is a single-threaded processor. In another implementation, processor 702 is a multi-threaded processor.

Memory 704 stores information within system 700. In one implementation, memory 704 is a computer-readable medium. In one implementation, memory 704 is a read-only memory (ROM). In one implementation, memory 704 is a random-access memory (RAM). In one implementation, memory 704 is a volatile memory unit. In one implementation, memory 704 is a non-volatile memory unit.

Storage device 704 is capable of providing mass storage for system 700. In one implementation, storage device 704 is a computer-readable medium. In one implementation, storage device 704 is a floppy disk. In one implementation, storage device 704 is a hard disk. In one implementation, storage device 704 is an optical disk. In one implementation, storage device 704 is a tape.

Input/output device 708 provides input/output operations for system 700. In one implementation, input/output device 708 is a keyboard and/or pointing device. In one implementation, input/output device 708 is a display unit. In some implementations, system 700 does not include input/output device 708.

A number of implementations of the invention have been described. Nevertheless, it will be understood that various modifications may be made without departing from the spirit and scope of the invention. This application is intended to cover any adaptations or variations of the implementations described herein. Accordingly, other implementations are within the scope of the following claims.

What is claimed is:

1. A computer-implemented method for coupling sessions on server entities, the method comprising:
   receiving, from a client entity and at a first server entity, a transmission having an identifiable user context, and in response creating a first session on the first server entity relating to the identifiable user context;
   receiving, from the first server entity and at a second server entity, a transmission related to the first session, and in response creating a second session on the second server entity relating to the identifiable user context;
   coupling the first and second sessions to create a common virtual session; and
   binding the common virtual session to the identifiable user context so that the first and second server entities recognize that subsequent transmissions from the client entity relate to the common virtual session.

2. The computer-implemented method of claim 1, wherein binding the common virtual session to the identifiable user context includes sending a session identifier for the identifiable user context to the client entity.

3. The computer-implemented method of claim 2, wherein sending a session identifier for the identifiable user context to the client entity includes sending web-enabled cookie information for the identifiable user context to the client entity.

4. The computer-implemented method of claim 1, wherein the method further comprises:
   receiving, at the second server entity, an additional transmission related to the identifiable user context; and
   in response, sending the additional transmission to the first server entity using the common virtual session.

5. The computer-implemented method of claim 4, wherein sending the additional transmission to the first server entity using the common virtual session includes routing the additional transmission through the client entity.

6. The computer-implemented method of claim 5, wherein routing the additional transmission through the client entity includes using a persistent connection between the second server entity and the client entity.

7. The computer-implemented method of claim 1, wherein the first and second server entities perform different functions in the common virtual session.

8. The computer-implemented method of claim 7, wherein creating a first session on the first server entity relating to the identifiable user context includes creating a first session on the first server entity, and wherein the second server entity provides a multi-threaded execution environment.

9. The computer-implemented method of claim 1, wherein receiving a transmission having an identifiable user context from a client entity includes receiving a transmission having an identifiable user context from a client entity using a web-based interface.

10. The computer-implemented method of claim 9, wherein receiving a transmission having an identifiable user context from a client entity using a web-based interface includes receiving a transmission having an identifiable user context from a client entity as a result of user input on the client entity.

11. The computer-implemented method of claim 9, wherein creating a first session on the first server entity relating to the identifiable user context includes creating a first session on the first server entity, and wherein the first server entity provides a customer relationship management (CRM) functionality.

12. A computer-implemented method for managing a session between a user and a specified person on a client entity, the method comprising:
sending a first transmission to a first server entity, the first transmission having an identifiable user context for the session between the user and the specified person;
receiving a unique session identifier for the identifiable user context from the first server entity;
storing the unique session identifier;
receiving a second transmission from a second server entity, the second transmission relating to the identifiable user context;
retrieving the unique session identifier; and
sending the unique session identifier and the second transmission to the first server entity.

13. The computer-implemented method of claim 12, wherein receiving a unique session identifier for the identifiable user context from the first server entity includes receiving web-enabled cookie information for the identifiable user context from the first server entity.

14. The computer-implemented method of claim 12, wherein receiving a second transmission from a second server entity includes receiving a second transmission from a second server entity using a persistent connection.

15. The computer-implemented method of claim 12, wherein the first and second server entities perform different functions for the identifiable user context.

16. The computer-implemented method of claim 12, wherein sending a first transmission to a first server entity includes sending a first transmission to a first server entity using a web-based interface.

17. The computer-implemented method of claim 16, wherein the method comprises managing a session between a calling agent and a customer.

18. A computer-readable medium having computer-executable instructions stored thereon for performing a method, the method comprising:
receiving, from a client entity and at a first server entity, a transmission having an identifiable user context, and in response creating a first session on the first server entity relating to the identifiable user context;
receiving, from the first server entity and at a second server entity, a transmission related to the first session, and in response creating a second session on the second server entity relating to the identifiable user context;
coupling the first and second sessions to create a common virtual session; and
binding the common virtual session to the identifiable user context so that the first and second server entities recognize that subsequent transmissions from the client entity relate to the common virtual session.

19. A computer-readable medium having computer-executable instructions stored thereon for performing a method, the method comprising:
sending a first transmission to a first server entity, the first transmission having an identifiable user context for a session between a user and a specified person;
receiving a unique session identifier for the identifiable user context from the first server entity;
storing the unique session identifier;
receiving a second transmission from a second server entity, the second transmission relating to the identifiable user context;
retrieving the unique session identifier; and
sending the unique session identifier and the second transmission to the first server entity.

20. A server system, comprising:
a first server entity to receive from a client entity a transmission having an identifiable user context, and in response create a first session on the first server entity relating to the identifiable user context;
a second server entity to receive from the first server entity a transmission related to the first session, and in response create a second session on the second server entity relating to the identifiable user context;
wherein the server system includes functionality to couple the first and second sessions to create a common virtual session, and to bind the common virtual session to the identifiable user context so that the first and second server entities recognize that subsequent transmissions from the client entity relate to the common virtual session.

21. The server system of claim 20, wherein the first and second server entities perform different functions for the identifiable user context.

22. The server system of claim 20, wherein the first server entity includes a web-based interface to communicate with the client entity.

23. A client system, comprising:
a storage mechanism; and
a session manager coupled to the storage mechanism, the session manager having functionality to:
send a first transmission to a first server entity, the first transmission having an identifiable user context for a session between a user and a specified person;
receive a unique session identifier for the identifiable user context from the first server entity;
store the unique session identifier in the storage mechanism;
receive a second transmission from a second server entity, the second transmission relating to the identifiable user context;
retrieve the unique session identifier from the storage mechanism; and
send the unique session identifier and the second transmission to the first server entity.

24. The client system of claim 23, wherein the storage element includes functionality to store web-enabled cookie information for the unique session identifier.

25. The client system of claim 23, wherein the session manager includes a web-enabled interface to communicate with the first and second server entities.

* * * * *